Figure 1:
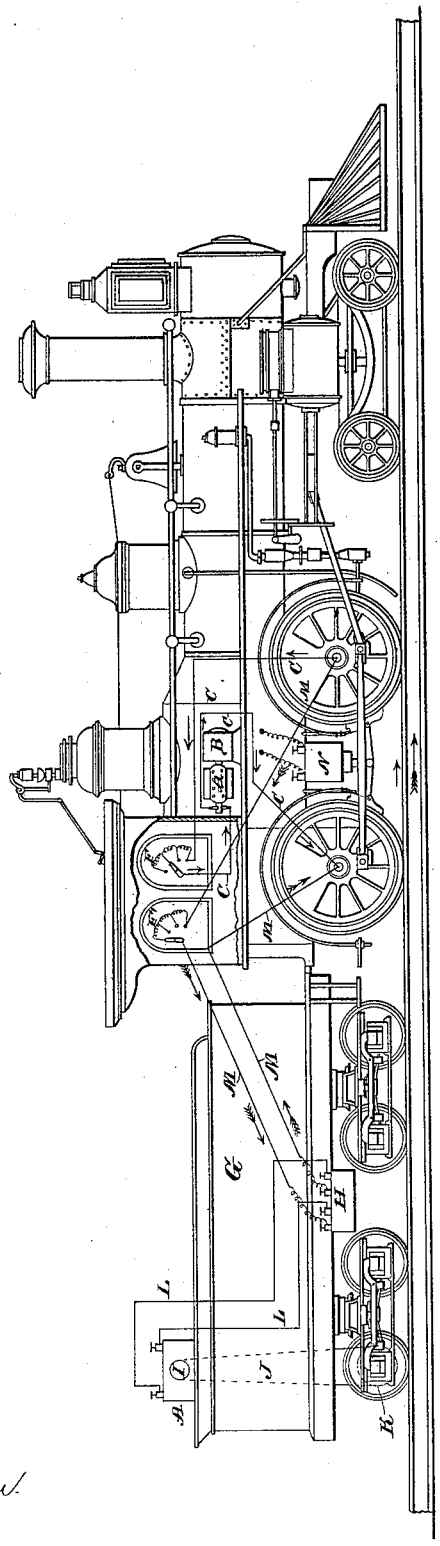

(No Model.) 2 Sheets—Sheet 1.

E. E. RIES.

APPARATUS FOR INCREASING THE TRACTION OF VEHICLES AND MOTORS.

No. 379,815. Patented Mar. 20, 1888.

Attest:
Geo. T. Smallwood.
William E. Schoenborn.

Inventor:
Elias E. Ries.
By Harding & Tichenor
his Attorneys.

(No Model.) 2 Sheets—Sheet 2.
E. E. RIES.
APPARATUS FOR INCREASING THE TRACTION OF VEHICLES AND MOTORS.
No. 379,815. Patented Mar. 20, 1888.
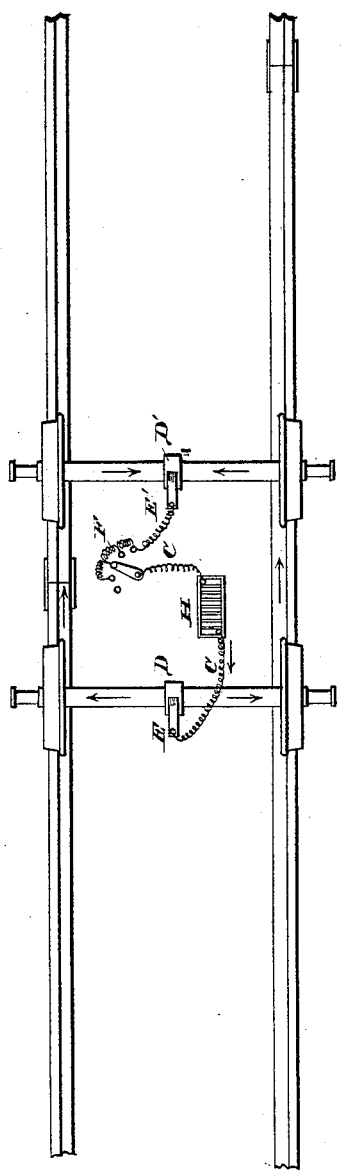
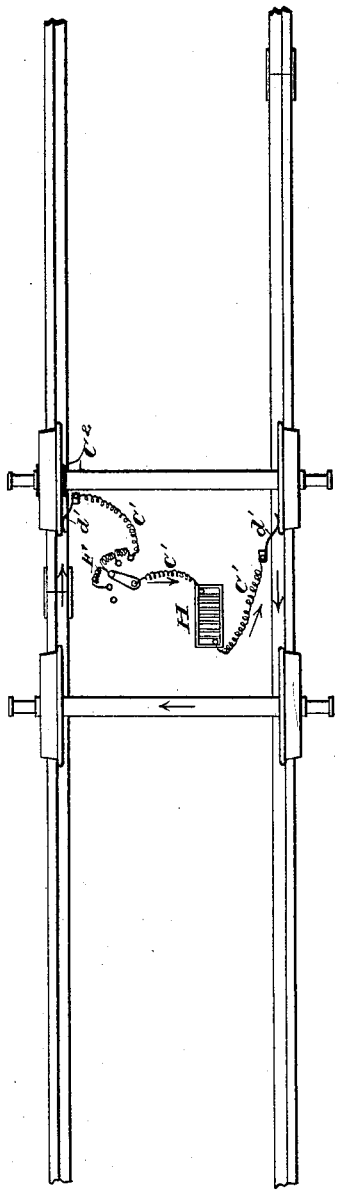

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

APPARATUS FOR INCREASING THE TRACTION OF VEHICLES AND MOTORS.

SPECIFICATION forming part of Letters Patent No. 379,815, dated March 20, 1888.

Application filed January 8, 1887. Serial No. 223,761. (No model.)

*To all whom it may concern:*

Be it known that I, ELIAS E. RIES, of Baltimore, in the State of Maryland, have invented certain new and useful Improvements in Apparatus for Increasing the Traction of Vehicles and Motors; and I do hereby declare the following to be a full, clear, and exact description of the same, reference being had to the accompanying drawings, forming part of this specification, and to the figures and letters of reference marked thereon.

My invention is based upon the fact that a strong adhesive effect between metallic conductors in contact with each other is produced when an electric current is passed from one to the other. This adhesion I have found to increase in proportion to the quantity of current passing between the conductors, and this effect is particularly noticeable when the frictional contact is a rolling one, as distinguished from sliding frictional contact, although it is also noticeable in the latter case.

In the operation of electric railways I have found that when the current is supplied to the motors on the cars through the rails upon which the wheels travel increased friction is caused by the passage of the current from the rails to the wheels, and that this increases the traction of the motor; but I have also found that this result, although beneficial in some cases, is detrimental to the operation of the system in other cases, for the increased traction will manifest itself at all times so long as the current passes—*i. e.*, so long as the motor is supplied with current and moves. The amount of traction in a system of the kind indicated is therefore not controlled by the operator or engineer, but fluctuates without regard to the momentary demands of the system, and in most cases in a manner contrary to these demands. Precisely the same thing I have found to happen in such systems of electrical locomotion where the current is supplied to the motor through separate conductors and is returned through the wheels and traction-rails; for as long as current is passing to the motor in the manner indicated there will be increased traction, due to the increased friction between the wheels and rails at their points of contact, produced by the current. The increased traction will therefore be present, whether at a given moment it may be desirable or not.

Now it is the object of my invention to utilize the phenomenon of increased friction produced by the passage of an electric current between the wheels of a motor-car and the rails upon which it travels for increasing the traction of the moving vehicle at the will of the operator or engineer, so as to have it entirely under control and adjustable according to the demands of the system from moment to moment. I accomplish this object in a variety of ways, all of which, however, have this in common, that I establish a self-contained electric circuit traveling with the motor-car or any other car upon the rails, and including two or more wheels of the vehicle and the rails extending between the same, and that I charge this circuit with an electric current independently of the current passing through the electric motor, if such motor be used. In case of steam-propulsion, the self-contained circuit, including the rails and wheels and traveling with the vehicle, which circuit I shall hereinafter call the "traction-circuit," is naturally independent of the steam-motor, and an electric current of any desired quantity may be passed through the same without in any way or manner affecting the motive power. Thus in both cases the motive power may be increased or diminished, and the motor may be run fast or slow, or it may be stopped entirely, while the frictional contact of the wheels with the rails may be variably increased, as desired, or as the circumstances may require.

In practicing my novel method of increasing the traction of motors in general it is preferable to employ a current of large volume and comparatively low tension; in fact, the current must be such as to produce considerable heating effect at the points of contact of the wheels with the rails, and unless such heating effect is produced to an appreciable extent there is no increase of traction. I desire to emphasize this point, so that it may be understood that the currents ordinarily employed for signaling and other purposes will be entirely insufficient to produce a perceptible trace of increased traction. The current therefore which must be employed to have the beneficial effect aimed at I shall hereinafter call a "traction-current," which will be understood to be such as produces a perceptible heating effect at the juncture of two metallic conductors through which it passes.

The apparatus which I employ for practicing my novel method may assume a great number of forms, some of which I have illustrated in the accompanying drawings, in which—

Figure 1 represents an elevation of a steam-locomotive and a car attached to it, both equipped with my invention; Fig. 2, a plan view of a vehicle traveling upon conducting-rails with the source of the traction-current on the vehicle; and Fig. 3, a similar view of a slightly modified form of the arrangement shown in Fig. 2.

Referring now to Fig. 1, there is shown upon the locomotive a dynamo-electric generator, A, adapted to furnish an effective traction-current. It is preferably driven by a small steam-engine, B, which is independent of the driving-engine of the locomotive and is supplied with steam from the steam-chest of the latter. The dynamo can thus be operated at any desired speed, whether the locomotive is running or not, and the circuit C C of this dynamo includes an adjustable rheostat, F, located in the cab of the engineer, and the driving-wheels of the locomotive, as shown. In the drawings the circuit-wires are shown as terminating at the axles of the driving-wheels, and it will be understood that they make contact with these axles by brushes, or in any other suitable manner. The circuit may be traced with reference to unfeathered arrows marked along the conductors. If it is desired to increase the traction of the locomotive, the engineer closes the traction-circuit at the rheostat by means of a switch-lever (shown,) and he can increase or decrease the resistance of the traction-circuit at will and can thereby decrease or increase the amount of current passing through the same. The current from the dynamo thus passes through the wires C C and from one driving-wheel or set of driving-wheels to the other driving-wheel or set of driving-wheels through the intervening section of rails.

In Figs. 2 and 3 this arrangement of circuits is indicated with reference to an apparatus in which any suitable source, H, of electricity is carried upon the locomotive or car. The two axles there shown may be supposed to be the driving-axles of a locomotive, and one of these axles must be insulated from the body of the locomotive. In Fig. 2 the circuit extends from one pole of the source of electricity to a brush, E, bearing upon a collar, D, fixed to one of the axles. At this point the current divides and passes, by the two wheels mounted upon that axle and by the rails on both sides to the wheels on the other axle, upon the collar D' of which axle the current unites again, and continues by a brush, E', and wire C, to the rheostat F, back to the other pole of the source of electricity. The circuit-connections indicated in Fig. 3 presuppose that one of the wheels is insulated from its axle, as indicated at C². The circuit is then from one pole of the source of electricity by wire C' to brush d, bearing upon one of the wheels, then by the rail on this side of the track to the wheel on the other axle, through that axle, and by the wheel at the other end of said axle, through the rail on that side of the track to the insulated wheel of the first axle, and by brush d', bearing upon said wheel, and by conductor C', through the rheostat F, back to the other pole of the source of electricity. Unfeathered arrows marked along the conductors facilitate the tracing of these circuits. Thus we see that the traction-current may be sent in multiple arcs composed each of a section of rail on one side of the track and the two wheels bearing upon the same; or it may be sent through four wheels of a truck in series with the intervening rails. In each case the current passes between four wheels and the rails and the traction is considerably increased.

The circuits thus far described may be arranged upon the locomotive shown in Fig. 1 in the manner indicated, in which case the dynamo A takes the place of the generators H H. (Shown in Figs. 2 and 3.)

Instead of driving the dynamo by a separate steam-engine mounted upon the locomotive, the same may be driven by suitable gearing connected with an axle of one of the vehicles of the train. This arrangement is shown in Fig. 1 as applied to the tender G; but in order to enable the engineer to control the traction independently of the motion of the train the traction-circuit is in this case not charged directly from the dynamo, but from a secondary battery charged by the dynamo. The driving-pulley I of the dynamo A is connected by a belt, J, (shown in dotted lines,) with a pulley, K, upon one of the axles of the tender, and the circuit L L, which is the external circuit of the dynamo, charges the secondary battery H, preferably in series, while the traction-circuit M M, into which the secondary battery discharges, (preferably in quantity,) includes an adjustable rheostat, F', located in the cab of the engineer, and the driving-wheels of the locomotive. This circuit is easily traced by means of feathered arrows marked along the conductors, and it will be understood that the current may pass either in multiple arc or in series through the wheels and the rails between the same, substantially in the manner shown in Figs. 2 and 3. Thus it will be seen that when the source of electricity is mounted upon the vehicle the traction-circuit may be made or broken and more or less resistance included in the same without in any way or manner affecting the driving-power. The degree of traction employed is thus absolutely under the control of the operator.

If a secondary battery is employed, as in the case where the same is carried upon the tender G, this secondary battery may be charged by a dynamo driven from an axle of the vehicle, as shown in Fig. 1, or it may be charged separately at the starting-station by independent dynamos there located, and Figs. 2 and 3 may be supposed to represent such system. If the charging-dynamo is driven from an axle of the vehicle, a great saving is accomplished, since in that case the dynamo will be made to charge the secondary battery when the train is coming to a stop or is running on a downgrade, making thus use of the momemtum of the train; and the current stored during this process can then be used to increase the traction when the train is starting or when it is running upon an ascending grade, when it is mostly needed.

In addition to charging the traction-circuit, the source of current upon the locomotive or other vehicle may also be used for the operation of magnetic brakes or electric head-lights. Such brake is conventionally indicated in Fig. 1 at N, and the circuit-wires n, proceeding from the same, will be understood to be properly connected with the source of electricity. In the drawings this connection has been omitted for the sake of simplicity of illustration, and because this use of the current does not constitute a part of my present invention.

It is apparent that the principles of my invention may be embodied in apparatus widely differing from the specific constructions herein shown and described, and that the methods of operation may also be variously changed without departing from the fundamental idea which underlies my invention. I am for this reason not limited to the identical features of detail set forth in this specifiation.

It is obvious that the traction-circuits need not necessarily be arranged in the manner shown in Figs. 2 and 3 to include four wheels of the vehicle, since it is quite practicable to pass the traction-circuit between two wheels only on one side of the track. Fig. 1 illustrates this mode of operation, if no reference is made to Figs. 2 and 3, and in the arrangement shown in Fig. 2 this will be the mode of operation if the car or vehicle should be on a section of the track where the adjoining rails on one side are accidentally insulated from each other at the fish-plates, as frequently happens.

My improved method and apparatus for increasing the traction of vehicles moving upon metallic rails being independent of the propelling-power, and not affecting the latter, it will be understood that the same are equally applicable to all kinds of vehicles, whether the same be propelled by steam, electricity, or any other power, and I wish it to be understood that I do not limit myself in this respect to the use of any particular motor for propulsion.

Having now fully described my invention, I claim and desire to secure by Letters Patent—

1. The method of increasing the traction of a wheeled vehicle moving upon a metallic track, which consists in establishing and maintaining a traction-circuit which moves with the vehicle and includes two or more wheels and that portion of the rails which extends between the same, and charging said circuit with a low-tension current of electricity, substantially as described.

2. The method of increasing the traction of a wheeled vehicle moving upon a metallic track, which consists in establishing and maintaining a traction-circuit which is independent of the motive power, moves with the vehicle, and includes two or more wheels and the portion of the rails extending between the same, and charging said circuit with a low-tension current of electricity, substantially as described.

3. The method of increasing the traction of a wheeled vehicle moving upon a metallic track, which consists in establishing and maintaining a traction-circuit which moves with the vehicle and includes two or more wheels and the portion of the rails extending between the same, and variably charging said circuit with currents of low tension, substantially as described.

4. The method of increasing the traction of a wheeled vehicle moving upon a metallic track, which consists in establishing and maintaining a traction-circuit which moves with the vehicle and includes two or more wheels and the portion of the rails extending between the same in series, and charging said circuit with a low-tension current or currents of electricity, substantially as described.

5. The combination of a closed electrical circuit moving with a railway car or vehicle, including that portion of the track-rails lying immediately below the said vehicle, or between the driving-wheels thereof, with a source of low-tension electricity for charging said circuit, substantially as described.

6. The combination of an electrical circuit moving with a railway car or vehicle, including that portion of the track-rails lying immediately below the said vehicle, or between the driving-wheels thereof, with a circuit-controller for said circuit and a source of low-tension electricity for charging said circuit, substantially as described.

7. The combination of an electrical circuit moving with a railway car or vehicle, including that portion of the track-rails lying immediately below the said vehicle, with means for varying the resistance of said circuit, and a source of low-tension electricity for charging said circuit, substantially as described.

8. The combination, with a wheeled vehicle adapted to travel upon an electrical conducting surface or surfaces, of an electrical generator furnishing currents of low tension and great quantity mounted upon the vehicle, and a traction-circuit formed in part by two or more wheels of the vehicle, the rails extending between the same, and the generator, substantially as described.

9. The combination, with a wheeled vehicle adapted to travel upon an electrical conducting surface or surfaces, of an electrical generator furnishing currents of low tension and great quantity mounted upon the vehicle, and a traction-circuit formed in part by two or more wheels of the vehicle, the rails extending between the same, the generator, and an adjustable rheostat, substantially as described.

10. The combination, with metallic track-rails, of a motor-car mounted thereon, having two connected pairs of driving-wheels, an electrical generator of currents of low tension and great quantity mounted upon the motor-car, and an electrical circuit including said generator, each of the said pairs of driving-wheels, and the portion of the conducting-rails between the pairs of wheels, substantially as described.

ELIAS E. RIES.

Witnesses:
LEOPOLD RIES,
FRANK PARRY.